United States Patent [19]

Weiss

[11] Patent Number: 4,699,266
[45] Date of Patent: Oct. 13, 1987

[54] TRANSPORTING APPARATUS FOR CONVEYING CARRIERS

[75] Inventor: Rafael Weiss, Kempten, Fed. Rep. of Germany

[73] Assignee: Liebherr-Verzahntechnik GmbH, Fed. Rep. of Germany

[21] Appl. No.: 707,964

[22] Filed: Mar. 4, 1985

[30] Foreign Application Priority Data

Mar. 12, 1984 [DE] Fed. Rep. of Germany ....... 3408963

[51] Int. Cl.$^4$ .............................................. B65G 15/14
[52] U.S. Cl. .............................. 198/803.2; 198/465.3; 104/234
[58] Field of Search .................. 198/345, 465.1, 465.3, 198/711, 793, 802, 803.01, 803.2, 838, 845, 850; 104/229, 231, 232, 234, 165

[56] References Cited

U.S. PATENT DOCUMENTS

| | | | |
|---|---|---|---|
| 3,931,882 | 1/1976 | Ossbahr | 198/803.2 |
| 4,088,220 | 5/1978 | Jacksch et al. | 198/465.3 X |
| 4,256,221 | 3/1981 | Lain | 198/465.3 X |
| 4,257,513 | 3/1981 | Siarto | 198/345 |
| 4,475,642 | 10/1984 | Fritz | 198/345 |
| 4,502,586 | 3/1985 | Dusel et al. | 198/345 |

FOREIGN PATENT DOCUMENTS

| | | |
|---|---|---|
| 1756438 | 4/1970 | Fed. Rep. of Germany . |
| 7308019 | 6/1973 | Fed. Rep. of Germany . |
| 2431244 | 12/1975 | Fed. Rep. of Germany . |
| 3243906 | 10/1983 | Fed. Rep. of Germany . |
| 3216949 | 11/1983 | Fed. Rep. of Germany . |

Primary Examiner—Robert J. Spar
Assistant Examiner—Lyle Kim
Attorney, Agent, or Firm—Bacon & Thomas

[57] ABSTRACT

A conveyor belt transporting apparatus for conveying carriers includes at least one conveyor belt frictionally engaged with the carrier, the conveyor belt formed of two belt layers, one lying on top of the other and extending between pulleys. A friction finger on the carrier is in frictional engagement with the belt by extending between its layers in frictional contact with both layers. Frictional contact force between the belt layers and the friction finger is variable by a moveable tension finger controllable by an automatic release element in response to blockage of movement of the carrier along the conveyor system. When the motion of a carrier is blocked by a stopped carrier or other impediment ahead of it, the release element is moved to release the friction force on the carrier finger engaging the belt. Verticle and horizontal guide and support rollers guide the carrier and support its weight.

13 Claims, 7 Drawing Figures

TRANSPORTING APPARATUS FOR CONVEYING CARRIERS

BACKGROUND OF THE INVENTION

The invention relates to a transporting apparatus for conveying carriers, according to the introductory part of claim 1.

Such a transporting apparatus is disclosed in German Offenlegungsschrift No. 17 56 438.

Such a transporting apparatus is used, for example, to convey workpieces from one production stage to the next, whereby the transporting apparatus must allow for a back-up of full or empty carrier as they arrive, which may come about due to the different speeds at which the workpieces are removed or loaded.

The known transporting apparatus exhibits a pair of parallel, mutually spaced continuous conveyor belts which run across deflection wheels. The carriers are each in frictional engagement with these belts in such a way that the conveyor belt can slide through in the case of a back-up.

Lifting apparatus, among other things, is necessary for conveying systems which make use of such transporting apparatus; the driving means is also elaborate. Furthermore, the number and weight of the carriers which can be moved by one transporting apparatus are limited due to the necessary frictional engagement.

These disadvantages are remedied by the subject-matter of German Pat. No. 25 22 299 by replacing the two conveyor belts by two continuous chains. These chains run in rigid guide tracks in two loops which are parallel to one another and each arranged on a vertical plane, those flanks of each chain which face one another protruding out of the guides. The carriers are attached to the protruding ends of the chains by means of resilient jaws.

Although the disadvantages stated above are remedied to a large extent by the latter transporting apparatus, this improved apparatus in turn involves considerable disadvantages, viz. great attrition, a high noise level imposed on the surroundings and in particular a complicated construction due to the chains themselves, the tension apparatus necessary therefor and the elaborate means for clamping the carriers. Furthermore, the overall length of the known transporting apparatus, as well as the number and carrying capacity of the carriers which can be moved thereby at the same time, are again limited, in particular because the jaws, which engage only with the flanks of the chains, tilt the chains in their guideways.

SUMMARY OF THE INVENTION

Assuming the problems indicated above, the invention is based on the object of improving the transporting apparatus stated at the outset, so as to reduce operational and constructional efforts, and allow in particular for more and/or heavier carriers as well as for differences in height to be overcome.

The conveyor belt (or each conveyor belt, when several parallel conveyor belts are provided) comprises two superjacent flat belt layers which are stretched across the deflection wheels. Thus, the, or each, conveyor belt has two strands, an upper and a lower one. Friction fingers are arranged on the carriers in such a way that they reach in between the two flat belt layers, which together form a conveyor belt, from the side at right angles to the layers.

Due to the engagement between the conveyor belt layers, each upper flat belt layer of the upper and lower strands, which sinks downward due to its weight, is slightly deflected upwardly around each friction finger, so that the frictional engagement between the finger and in particular the upper belt layer is established not only as a result of the frictional coupling and the inherent weight of the belt, but also as a result of the angle of belt contact formed at the friction finger by the flat belt layer suspended above it.

When several carriers pile up in the case of a back-up, their fingers are only spaced a small distance from each other, so that the belt layer lying on the upper sides of these fingers no longer forms an angle of belt contact, as described above. Therefore, the friction transferred from the belt layer onto the fingers, and thus the required power for the inventive transporting apparatus as well, are reduced in the case of a back-up.

The two belt layers lie tightly against one another on the outer periphery of the deflecting pulleys by which they are driven, so that each finger which runs onto the deflecting pulley is firmly clamped between the two layers, to a certain extent, and remains fixed relative to the deflecting pulley until it has passed along its periphery and runs off it. It is thus possible to transfer loaded carriers from the lower strand to the upper strand and vice versa, without the carriers, which may be heavily loaded, tending to slip through.

The constructional effort for the inventive transporting apparatus is extraordinarly low, even though it is capable of performing all the functions of the known apparatus described at the outset; there is no longer a need for a chain tension means, as compared in particular with the apparatus equipped with conveyor chains, since it is sufficient to dimension the belts forming a conveyor belt in such a way that they must be stretched by approximately 1 to 3% when being wound onto their pulleys, in order to ensure that these belts remain sufficiently tight during their entire operating life.

The only attrition which comes about in the apparatus is in the belts, which must be replaced from time to time. The metal parts (in particular on the individual carriers) which are more difficult to produce and replace, i.e. the fingers, are not subject to any attrition whatsoever.

Further, the required energy is very low for the additional reason that the conveyor belts are relatively lightweight and the means which establish frictional engagement are formed merely by simple fingers. A greater portion of the overall weight permissible for a loaded carrier thus falls to the useful load than in the case of known carriers.

The inventive apparatus also allows for carriers to be easily inserted and removed, since the engagement between the carrier and the belts can be simply established and released by pushing the finger in between the belts and withdrawing it from them, respectively.

It is also possible to create non-driven zones, if necessary, by spreading apart the two belts.

Thus, the engagement of individual carriers or several groups of carriers with the belts can be established or released with extremely little control effort.

In order to allow for a larger load, i.e. a larger number of carriers and/or heavier carriers, and also to cover greater distances by means of the apparatus, if required, it is proposed according to a further embodiment of the invention that the lower belt layer of the upper strand, preferably of the lower strand as well, lie substantially along its entire length on a supporting surface. The supporting surface increases the carrying capacity of the apparatus and ensures at each point of the path covered by the belts that the necessary frictional engagement is established between the belt which is at the top at any given time, and the fingers.

This supporting surface is preferably provided with an anti-friction coating, for example of polytetrafluoroethylene, and is preferably formed by a thin steel strip which may be provided in turn with extremely little constructional effort and whose natural sag when loaded corresponds to that of the belts and is thus not detrimental.

In a particularly simple embodiment of the invention, the fingers, and thus also the belts, bear the weight exerted by the carriers and the useful load. In order to ensure that the apparatus be loaded to a higher degree, however, it is proposed according to a further embodiment of the invention that at least one running rail should be provided extending along the apparatus; preferably, a running rail is provided on each side of the apparatus, one below the upper strand, and the other above the lower strand, of the two conveyor belt layers each formed by two belts.

The carriers are each provided with at least one roller, preferably with four rollers altogether, which are mounted so as to be easy-running and via which the carriers are supported on the running rails. The fingers thus take over only the drive of the carriers designed as carts.

In order to obtain the necessary driving power it is advantageous to provide several parallel fingers on each carrier, whereby these fingers must be at a certain minimum distance from each other to allow for the above-described effect of the angle of belt contact to come into play, at least to a limited extent. Each carrier preferably exhibits on each side (in the preferred embodiment with two conveyor belts) two fingers which engage between the belt layers.

In order to change the driving engagement between the friction fingers and the flat belts, means for changing the position of the fingers relative to the conveyor belt are provided according to a further embodiment of the invention.

In order to improve the frictional engagement, at least one additional tension finger is provided according to a further embodiment of the invention, this finger being arranged close to one of the above-mentioned friction fingers and substantially parallel thereto. The position of this tension finger is selected relative to the adjacent friction finger in such a way that the corresponding adjacent belt layer is deflected from its direction of running when it is conducted through between the friction finger and the tension finger. The greater the deflection of the belt, the greater the angle of belt contact which occurs at the friction finger and the tension finger, and the greater, therefore, the frictional engagement with these elements.

Therefore, the tension finger is arranged outside the outer belt layer according to a preferred embodiment of the invention. When the corresponding carrier runs across one of the pulleys, the tension finger associated therewith has no effect because the belt running around the periphery of the pulley is curved away from the tension finger.

In the case of the preferred embodiment with two conveyor belts, it is basically possible to arrange a tension finger at only one of the conveyor belts. However, this design requires a further, preferred embodiment of the invention, according to which the carriers are assigned at least one running rail extending along the conveying means and preferably cooperating with at least one verticle guide roller with a vertical axis. It is then necessary that the running rail exhibit two zones of contact which may be arranged on each side of a web (in which case the guide roller assembly comprises two individual guide rollers); however, it is also possible to use two mutually spaced vertical walls, a single verticle guide roller engaging mutually with each of the wall surfaces facing each other. The function of a roller and a guide roller may be performed by one roller.

The tension finger may be arranged rigidly or adjustably; in the latter case it is possible to select the frictional force with which the tension finger and corresponding friction finger engage with the corresponding belt, by adjusting the position of the tension finger.

According to a further embodiment of the invention, however, the tension finger is movably arranged laterally of its longitudinal axis, preferably up to disengagement from the corresponding belt layer, in order to allow for the intensity of frictional engagement to be selected from zero to full engagement.

According to a further embodiment of the invention, a displaceable release element is arranged on the front of each carrier, this element being connected with the tension finger in such a way that when the release element runs into resistance, for example the last carrier at a back-up point, the release element is moved to raise the tension finger out of engagement with the belt, so that only relatively low frictional force occurs on the friction finger itself and ensures that the back-up constantly moves along promptly.

It is particularly advantageous according to a further embodiment of the invention, however, that the means connecting the tension finger with the release element is a locking means by which the two end positions of the tension finger can be locked in and out of engagement with the belt. A relatively simple locking means on each carrier thus ensures that the tension finger does not assume an intermediate position, for example, in which increased slippage and thus increased friction occurs on the corresponding belt, but rather a precisely defined engaged and disengaged operating state can be obtained in accordance with the deflection of the release element. When the foremost carrier is removed in a back-up, for example, the following carriers catch up successively and quickly; is it thus possible to remove carriers from an existing back-up at high speed, since all carriers in the back-up are fully engaged when their release elements have been released, and immediately reach their full speed of movement. However, the individual engagement processes take place successively so that the belt and driving means are never strained.

A pulling layer provided on each side with a friction layer is preferably used as a belt, the pulling layer assuring its tensile strength while the friction layers assure that the necessary frictional engagement is established.

It is possible in addition to provide the outer surface of the outer belt with a stationary cover, which is preferably formed by a thin spring steel strip and serves to protect the surface of the belt.

The invention relates not only to a transporting apparatus of the above-mentioned kind, but also to a conveyor system which makes use of such transporting apparatus.

Since each of the transporting apparatus can only have a limited length, several such transporting apparatus are arranged one behind the other to cover larger distances. The above-mentioned locking means connected with the outer member allows for the foremost carrier of a back-up on one belt to be released via a simple rocking lever in accordance with the arrival of a carrier at the end of the other belt. This is coordinated in such a way that when the carrier of the stated first apparatus moves downwardly at its respective pulley, another carrier comes towards it from below at pulley of the other apparatus, so that an object to be transported, for example a workpiece, can be readily thrown over from one carrier onto the other without any special transferring means.

A particular advantage of the invention is also that the inventive apparatus may be arranged on a slant or even vertically within a system making use of these apparatus, since the frictional engagement between the fingers and the belt which may be established by simple means according to the invention completely suffices for loaded carriers to be conveyed upwardly as well.

It is thus possible to take care of all problems of transport which arise within a conveyor system, using the inventive apparatus.

BRIEF DESCRIPTION OF THE DRAWINGS

The subject-matter of the invention shall be described in more detail by way of example with reference to the adjoined schematic drawings. These show.

DESCRIPTION OF PREFERRED EMBODIMENTS

Figure 1:
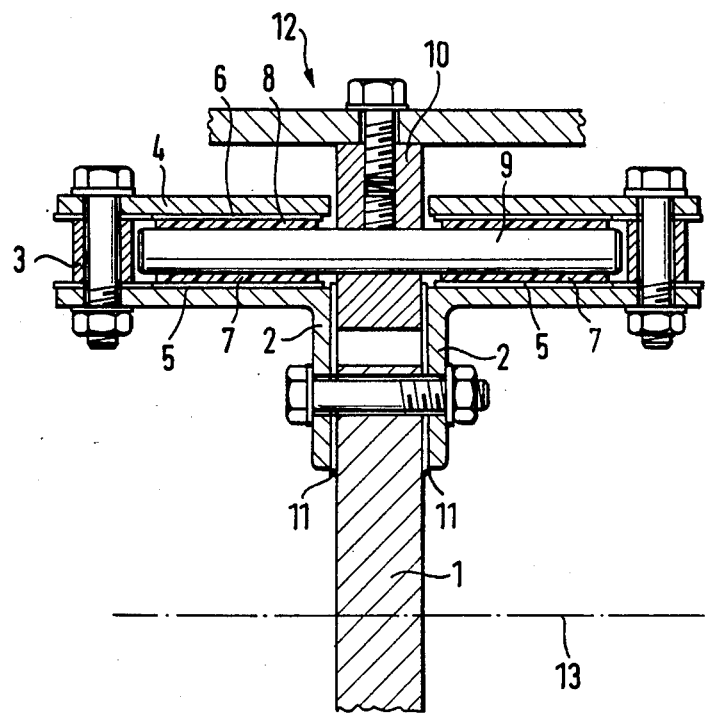
FIG. 1 a cross-section of a first embodiment of an inventive apparatus

FIG. 1 shows a first simple embodiment of the inventive transporting apparatus in a vertical cross-section, only the upper part of the apparatus being shown.

The apparatus exhibits a supporting center bar 1 on which angles 2 in the form of L-bars are arranged successively at longitudinal intervals and each opposite another, these angle being screwed together and clamping center bar 1 between each other.

A bearing spacer 3 is placed on the top of each angle 2 at its outer end, a holder 4 made of a straight pieces of band iron being placed on the upper end of each bearing spacer 3 extending parallel to the angle and inwardly. Angle 2, bearing spacer 3 and holder 4 are each clamped together by a screw which runs through the interior of bearing spacer 3.

A bed 5 which is supported on angle 2 and made of a spring steel strip is located on the top of each angle, extending parallel to center bar 1.

Facing this bed 5 a cover 6 is provided on the underside of angle 2, this cover 6 also extending parallel to center bar 1 and being made of a spring steel strip.

The upper strand of an inside belt layer 7 (the terms "inside" and "outside" being used with reference to the pulley over which the belts are tensioned) lies on the lower spring steel strip 5, while an outside belt layer 8 lies against the underside of the upper spring steel strip 6.

A friction finger 9 designed as a cylindrical pin is arranged between the two belt layers and penetrates a vertical carrier support in the horizontal direction and at right angles to the conveying direction of belt layers 8, 7.

Carrier support 10 extends downwardly in between the two vertical legs of the two angles 2 which are provided in this area with an anti-friction coating 11. Carrier support 10 is supported laterally on the coatings, thereby forming the necessary lateral guidance for a carrier 12, on the underside of which carrier support 10 is provided.

It is evident that when the two belt layers 7, 8 move jointly, the friction finger or pin 9 clamped between them is carried along by belts 7, 8 by frictional engagement.

Figure 2:
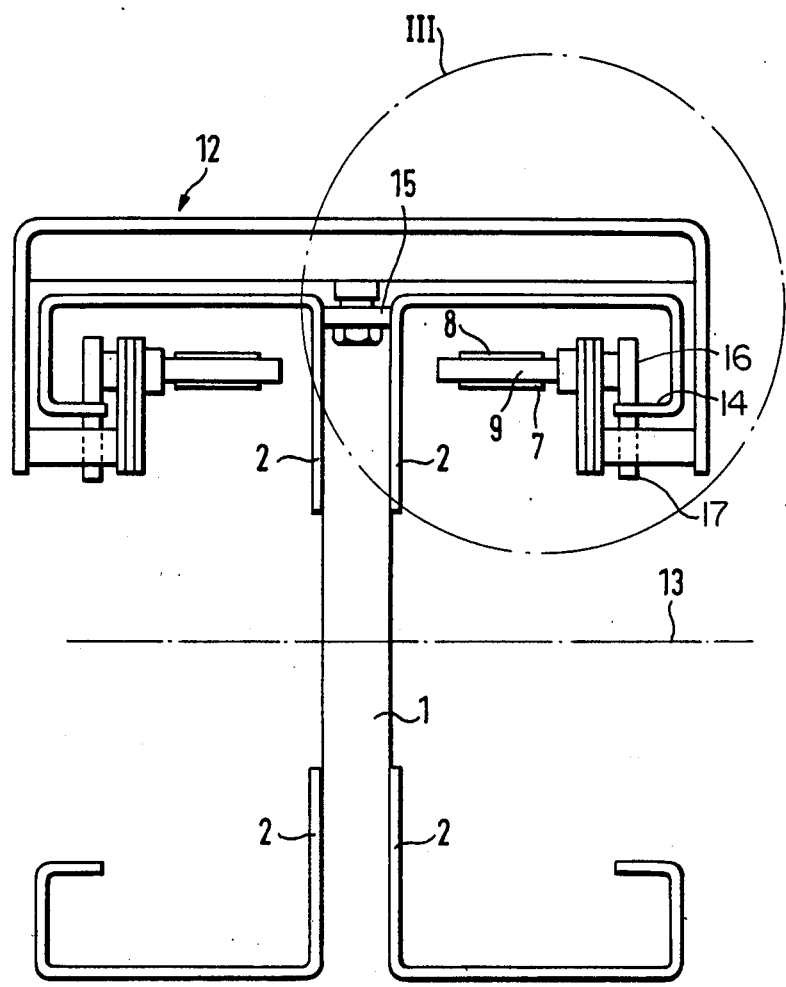
FIG. 2 a section of a second embodiment of the inventive apparatus
Figure 3:
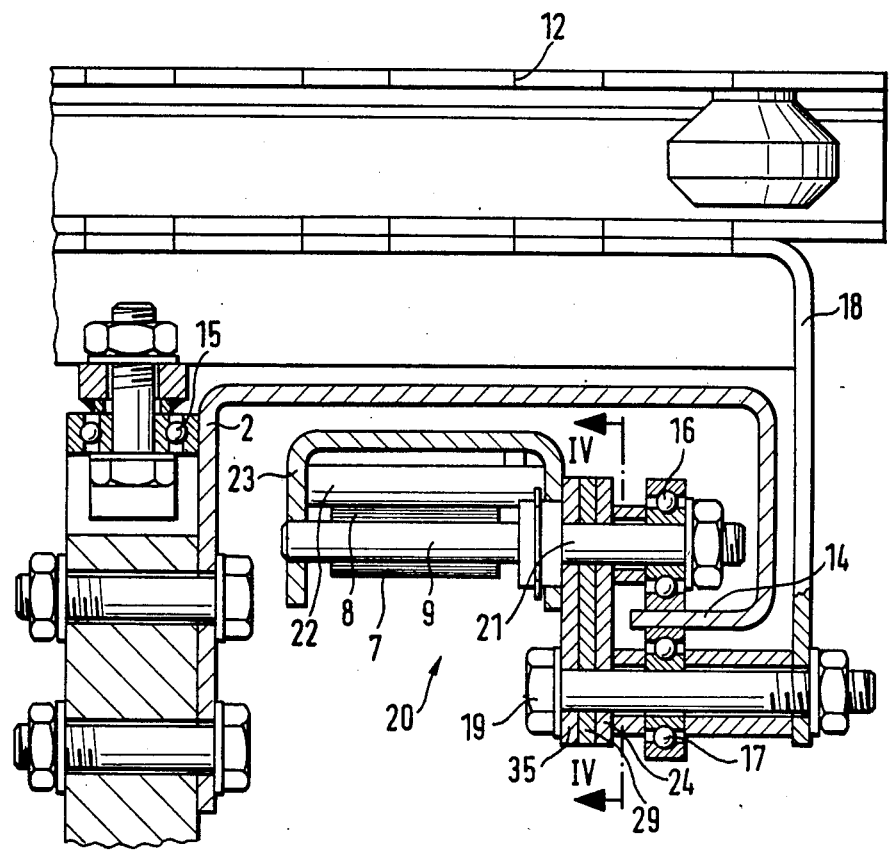
FIG. 3 a detailed cutaway portion of the view of FIG. 2

FIGS. 2 and 3 show a different embodiment of a transporting apparatus designed to transport greater loads, or heavier carriers, and across greater distances.

FIG. 2 shows a cross-section of the entire apparatus, whereby details are only shown in the upper part of the section divided by a center line 13. FIG. 3 shows more precisely the detail III referred to in FIG. 3 and belonging to this upper part.

The apparatus shown in FIGS. 1 and 2 show a number of points in common, i.e. a center bar 1 on the top and bottom of which angles 2 are provided.

In the embodiment in FIG. 2 the angles are not designed, as in FIG. 1, merely as simple L-bars but exhibit in addition to such an angular portion a second such portion which is fixed at the end of each horizontal leg on the side of center line 13 and at right angles, and in turn exhibits a second, free, horizontal, short leg extending towards center bar 1.

The latter-mentioned short leg bears a running rail extending in the longitudinal direction of the apparatus. In the embodiment shown, angle 2 is an uninterrupted profiled beam, so that the latter-mentioned leg extending horizontally and from the outside towards center bar 1, itself forms the uninterrupted running rail 14.

As in the apparatus of FIG. 1, angles 2 protrude beyond center bar 1, thereby forming between each other one groove in each case, extending in the longitudinal direction of the apparatus and serving to guide carrier 12. By contrast to the embodiment of FIG. 1, however, the carrier is provided in the center with a vertical guide roller 15 with a vertical axis, which is formed by the outer ring of a roller bearing, in particular a deep groove ball bearing (see FIG. 3).

Vertical guide roller 15 serves only to support carrier 12 laterally; the latter is supported vertically on running rail 14 via horizontal support rollers 16, 17. Roller 16 bears it when it runs along the top of center bar 1, and roller 17 bears it when it runs along the underside of center bar 1.

Support rollers 16 and 17 are also formed by the outer ring of a roller bearing.

The carrier 12 itself exhibits on each side edge a downwardly extending bar 18 which extends in the direction of center line 13 beyond rail 14, and in the ends of which supporting screws 19 are provided which extend in the direction of center bar 1, bear rollers 17 at their outer ends and hold a driver means 20 extending towards the carrier at their inward ends.

On the side of running rail 14 facing away from roller 17 a pin 21 extending horizontally and at right angles to the longitudinal direction of the apparatus is provided in driver means 20, this pin 21 bearing roller 16 at its outside end and being designed as a friction finger 9 at its end facing center bar 1, finger 9 being embraced by a U-shaped element 23 open towards the bottom.

On the top and underside of this finger 9 there is an outer flat belt layer 8 and an inner flat belt layer 7, respectively, which together form a conveyor belt. The mutual assignment of outer flat belt 8, inner flat belt 7 and friction finger 9 is similar to that of the elements with the same reference numbers in the apparatus of FIG. 1.

However, in addition a tension finger 22 is arranged in driver means 20, as can be seen in FIG. 3, this tension friction finger 22 extending parallel to finger 9 and being arranged on the side of outer flat belt layer 8 facing away from friction finger 9.

By means of a mechanism which will be described in more detail in connection with FIGS. 4 and 5, tension finger 22, which is somewhat staggered in the longitudinal direction of the apparatus with respect to friction finger 9, can be moved laterally and closer to outer flat belt layer 8 or away from it, so that the tension finger is virtually disengaged from outer flat belt 8 in one of its end positions, but forces it, in its other end position, to change its direction of running when passing the gap between friction finger 9 and tension finger 22, thereby establishing better frictional engagement.

Figure 4:
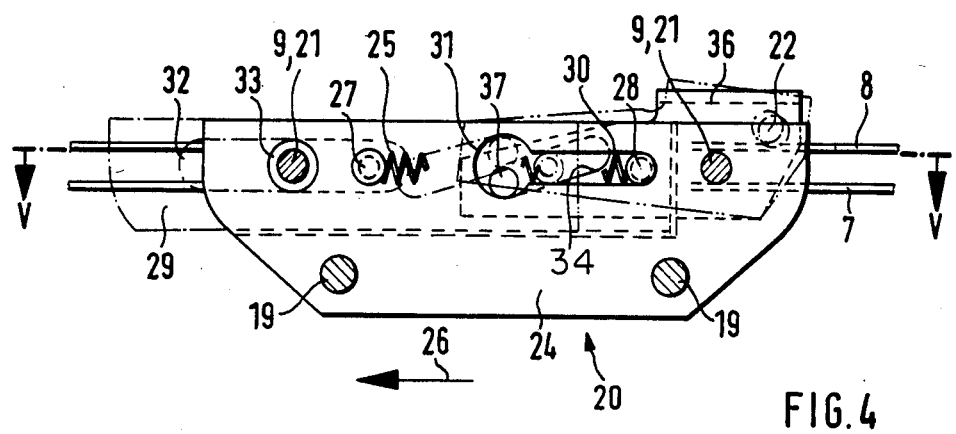
FIG. 4 a side view of part of an inventive carrier
Figure 5:
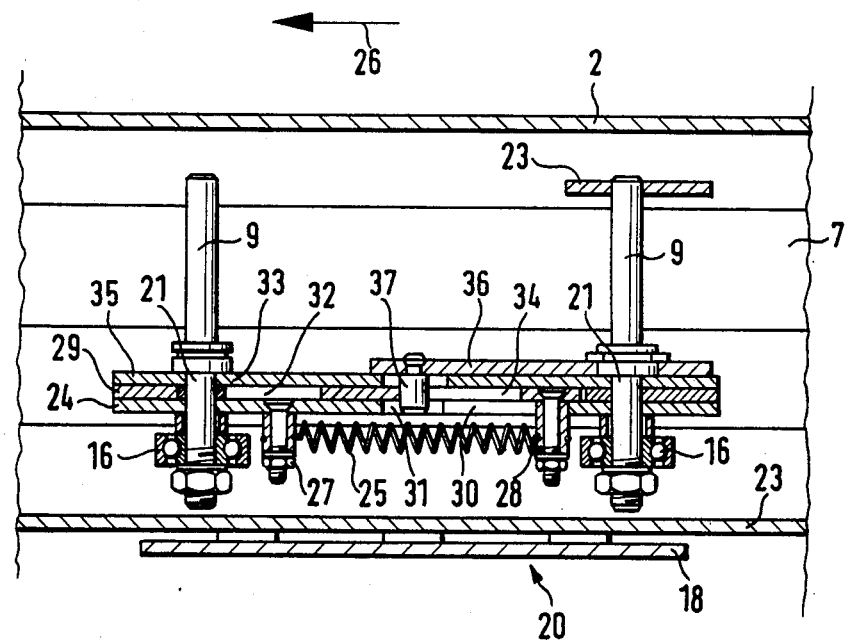
FIG. 5 a horizontal section of the part shown in FIG. 4

The driver means 20 only suggested in FIGS. 2 and 3 is shown more clearly in FIGS. 4 and 5, whereby FIG. 4 shows a cross-section along line IV—IV in FIG. 3, while FIG. 5 shows a horizontal section along line V—V in FIG. 4.

In order to aide comprehension, elements already explained with reference to FIGS. 2 and 3 are provided in FIGS. 4 and 5 with the same reference numbers.

Driver means 20 exhibits a flat base sheet 24 which is arranged vertically and in the longitudinal direction of the apparatus. Two pins 21 are firmly attached to this base sheet at a distance apart. These pins are prolonged on one side, as aleady described above, forming fingers 9, while they each bear a roller 16 on the other side.

The conveying direction is marked by an arrow 26 in FIGS. 4 and 5.

Behind pin 21, which is located at the front in the conveying direction 26, an anchoring bushing 27 is provided on base sheet 24, this bushing 27 extending on that side of base sheet 24 on which roller 16 is arranged.

Starting at this anchoring bushing 27 a flat spiral tension spring 25 extends rearward opposite the conveying direction 26, is fixed at a second bushing 28 and strives to pull the latter towards the front.

Rear anchoring bushing 28 is attached to a slide 29 and penetrates base sheet 24 in an oblong hole 30 which, starting at the position of rear anchoring bushing 28 shown in FIG. 5, extends towards the front, becoming a circular recess 31 approximately in the center between the two pins 21, the diameter of this recess 31 being about twice as large as the width of oblong hole 30.

In the front portion of slide 29 there is a front oblong hole 32 which extends in the conveying direction as does the rear one 30.

An annular bushing 33 is inserted onto pin 21, engaging oblong hole 32.

Under the influence of tension spring 25, slide 29 is moved leftward in the conveying direction out of the position shown in FIG. 5 into the position shown by the dot-dash lines in FIG. 4, slide 29 projecting forwards by about 30 mm beyond driver means 20. Rear anchoring bushing 28 moves in stationary oblong hole 30 and stationary bushing 33 moves in movable oblong hole 32, so that the clean straight guidance of slide 29 is assured by simple means.

In slide 29 there is also a slanted oblong hole which constitutes a sliding slot 34 which runs past circular recess 31, when slide 29 moves between its two end positions, in such a way that the end of slot 34 is located in the position of FIG. 4 (front position) of slide 29 behind the upper half of recess 31, while in the rear position of slide 29 (FIG. 5) the front end of slot 34 is located behind the lower half of recess 31.

On the side of slide 29 facing away from base sheet 24 there is a supporting sheet 35 which is firmly connected, as is base sheet 24, to pin 21.

Sheets 24 and 35 thus form the supporting housing for driver means 20.

On the side of supporting sheet 35 facing away from base sheet 24, there is a pivot arm 36 which is also formed by a sheet, is pivoted to rear pin 21 (the right-hand pin 21 in FIGS. 4 and 5) and extends only slightly further than the center of the driver means. Approximately in the center between the two pins 21 there is a driving pin 37 at the end of pivot arm 36, which driving pin extends diagonally through the device up to the outer surface of base sheet 24, its diameter being approximately as large as the width of sliding slot 34.

Driving pin 37 protrudes into circular recess 31, penetrating a corresponding recess, which may even be somewhat larger, if required, in supporting sheet 35.

Pivot arm 36 extends toward the rear and upwardly beyond rear pin 21 and bears tension finger 22 (shown only schematically in FIG. 4) in the area of its upper end.

As can be seen in FIG. 4, pivot arm 36 with its driving pin 37 may carry out a pivoting movement which is limited by the rim of circular recess 31. In the course of this pivoting movement, tension finger 22 is displaced and assumes the two end positions shown in FIG. 4, whereby the outer flat belt layer 8 runs past the tension finger virtually without contact when it is in the upper or front end position, while it presses against this flat belt layer 8 in the other end position so that the latter does not run through driver means 20 in a completely straight line but is bent towards the rear and downwardly above rear friction finger 9 and is again bent below tension finger 22 in such a way that it resumes its horizontal position.

The described movement of tension finger 22 results from the movement of slide 29 and carry fingers 9 and 22 and/or the sliding slot 34 disposed therein.

In the position of rest shown in dot-dash lines in FIG. 4 spring 25 draws slide 29 forward so that it protrudes beyond base sheet 24 and supporting sheet 35. At the same time sliding slot 34 moves forward, necessarily moving driving pin 37 upward by a camming action and the force of spring 25; this moves tension finger 22 downward, establishing frictional engagement with flat belt 8.

In the case of a back-up or a stopping point otherwise provided, the part of slide 29 which has moved out runs either onto the driver means of a carrier which is already standing still or onto an obstacle and comes to a halt, while the corresponding carrier continues to move forward together with driver means 20. This causes spring 25 to be tensioned and supporting sheet 35 and base sheet 24 to move together with the carrier forwardly across sliding slot 34, which is already standing still, until they in turn come to a halt by virtue of the back end of oblong hole 30 running against rear anchoring bushing 28 attached to slide 29. The relative movement between slot 34 and the rest of driver means 20 causes driving pin 37 to move out of its upper end position into its lower end position, thereby pivoting arm 36 and tension finger 22 out of engagement from outer belt 8. Sufficient friction remains between fingers 9 and flat belts 8 and 7 to prevent the force of spring 25 from moving the entire carrier toward the rear.

When the obstance hindering drive 20 and causing slide 29 to assume its retracted position (FIG. 5) is removed, it moves back into its forward extended (FIG. 4) position, thereby automatically reengaging driver means 20 with flat belt 8.

Figure 6:
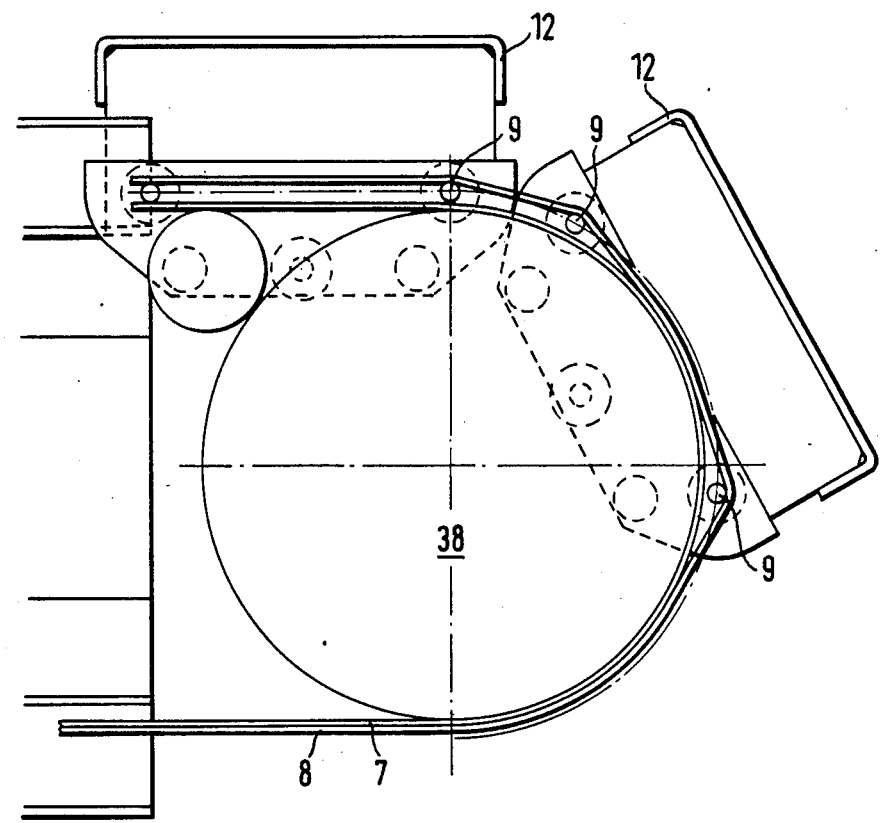
FIG. 6 a view of the end of an apparatus, in particular a pulley.

FIG. 6 shows the end of a conveyor device.

Outer and inner flat belt layers 8, 7 run in normally contiguous relationship along the periphery of a deflection wheel or pulley 38. In the process, fingers 9 of each carrier 12 are firmly clamped between the two flat belt layers 8, 7, whereby not only a considerable pressure force, but also a considerable angle of belt contact, as can be seen in FIG. 6, contribute to the development of an extraordinarily high frictional force which prevents fingers 9 from being displaced in the conveying direction of flat belts 8, 7.

Thus carriers 12 may be used to raise or lower considerable loads when they run across a deflection wheel 38.

Figure 7:
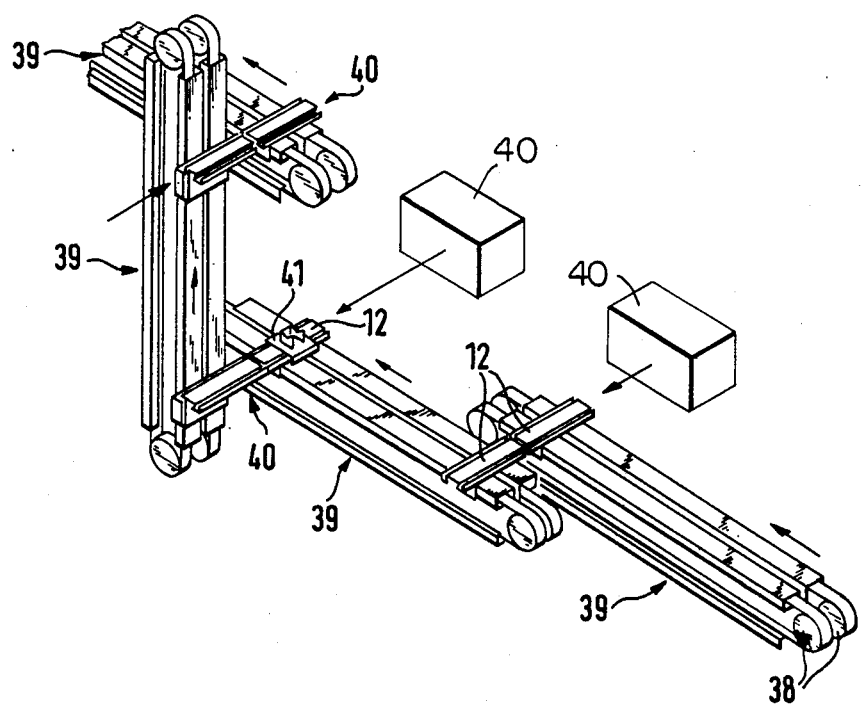
FIG. 7 a schematic view of an inventive conveyor system having several inventive transporting apparatus

FIG. 7 shows a conveyor system in which several transporting apparatus 39 of the above-described type are joined together.

These transporting apparatus 39 each terminate in the area of the end of a following transporting apparatus 39, sharing with it a transfer unit 40 on which each carrier 12 of one transporting apparatus 39 either comes to a halt beside a carrier 12 of the other apparatus, or is moved at the same speed until a pallet 41, which is designed to receive objects, is transferred from one carrier 12 to the other.

Due to the simple construction of the apparatus, assembly is also very simple and virtually no maintenance is required during operation. Furthermore, longer conveying paths are possible than up to now, and no additional constructional effort is necessary to deflect, or exploit deflection, for raising or lowering objects.

When the belt is suitably coated, it can run directly on steel beds and thus does not require any additional synthetic beds.

In the embodiment of FIG. 1, a pallet loaded with approximately 2 kg may be placed on a carrier, while in the embodiment of FIG. 2, the pallet placed on carrier 12 may bear up to 25 kg.

In spite of the large load, the required energy is extremely low, especially since the flat belts are not slowed down due to the automatic disengagement of the carriers at back-up points.

The use of these flat belts also involves a very low overall height, since their thickness is only 2 to 2.5 mm.

Particular advantages of the transporting apparatus shown are that it can carry a greater load when further conveyor belts are provided, and does not require any oil due to its no-lubrication operation, so that it can be used in food enterprises.

Furthermore, its operation involves extremely little noise.

We claim:

1. A conveyor belt transporting system comprising at least one conveying carrier; at least one endless conveyor belt extending parallel to the conveying direction in frictional engagement with the carrier and running between and across spaced pulleys, said belt driven by at least one of said pulleys, each belt comprising two superjacent belt layers (7, 8) traveling in normally contiguous relationship over said pulleys, with the first layer against the pulley and the second layer against the first layer opposite the pulley side of the first layer; said at least one carrier including at least one friction finger (9) extending transversely between the belt layers (7, 8), said friction finger being in frictional engagement with adjacent surfaces of said belt layers said belt layers capable of movement relative to the friction finger along the conveying direction.

2. The conveyor belt transporting system according to claim 1, including means (22) for varying the position of the second layer (8) relative to the first layer and said friction finger so as to vary the friction force between the conveyor belt and the friction finger.

3. A conveyor belt transporting system according to claim 1, including a tension finger (22) mounted on said at least one carrier adjacent said friction finger, said tension finger disposed adjacent the outer surface of the second belt layer, said tension finger arranged so that said second layer is deflected toward said friction finger when said tension finger engages said second layer.

4. The conveyor belt transporting system according to claim 3, wherein the tension finger (22) is movable towards and away from said second layer so as to selectively engage and disengage said second layer.

5. The conveyor belt transporting system according to claim 4, said at least one carrier including a movable release element (29) movable between forward and rearward positions relative to the conveying direction of the conveyor belt, said release element arranged so that movement of said tension finger away from said second layer is effected by movement of said release element towards its rearward position, and so that movement of said tension finger towards said second layer is effected by movement of said release element towards its forward position.

6. The transport system according to claim 4, said belt layers being flat, said friction and tension fingers being elongated and extending parallel to the belt layers, said tension finger being movable transversely of its longitudinal axis to selectively engage and disengage said second layer.

7. The transport system according to claim 4, said carrier including a friction finger support member (24, 35); a tension finger carrier (36) pivotally supported by the friction finger support member; said friction finger carrier arranged so that pivotal motion of the carrier moves the friction finger towards and away from said second belt layer; and means connecting said release element and said carrier so as to cause pivotal movement of said carrier when the release element moves between its forward and rearward positions.

8. The conveyor belt transporting system according to claim 7, said means connecting said release element and said carrier comprising a cam and follower, and including spring biasing means for normally urging said release element towards its forward position.

9. The conveyor belt transporting system according to claim 1, said at least one carrier including horizontal support rollers, and including horizontal running rails (14) engageable by said support rollers for supporting the weight of said at least one carrier.

10. The transport system according to claim 2, wherein said least one carrier includes at least one vertical guide roller (15) rotatable about a vertical axis, and including at least one vertical guide rail engageable by said vertical guide roller.

11. The conveyor belt transporting system according to claim 1, comprising two of said endless conveyor belts disposed laterally adjacent and parallel to each other; said at least one conveying carrier including two friction fingers, one finger disposed between the layers of each conveyor belt; said at least one carrier including a vertical guide roller (15); and a vertical guide roller track means (2) for engaging said vertical guide roller; said vertical guide roller track disposed between said conveyor belts.

12. The conveyor belt transporting system according to claim 11, said at least one carrier including horizontal guide roller means laterally spaced on opposite sides of said vertical guide roller; and horizontal guide track means for engaging said horizontal guide rollers; said horizontal guide track means extending in the conveying direction.

13. A conveyor belt transporting system according to claim 1, said conveyor belt including upper and lower strands, and including a rigid support surface for said first layer along the upper strand and a support surface for the said second layer along the lower strand.

* * * * *